March 8, 1949.  R. F. WILD  2,464,193
CONTROL APPARATUS
Filed July 18, 1945　　2 Sheets-Sheet 1
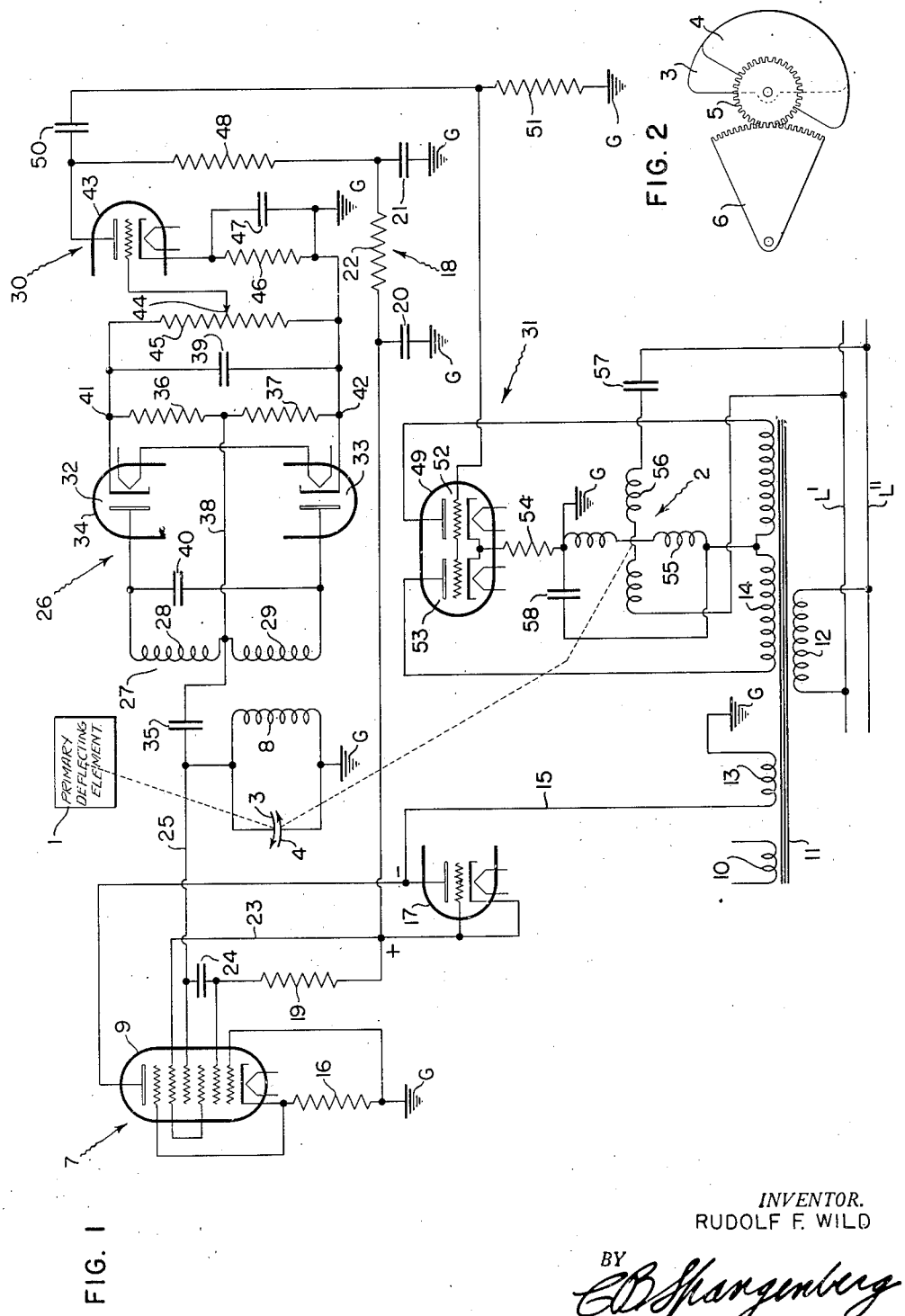
INVENTOR.
RUDOLF F. WILD
BY
CB Spargenberg
ATTORNEY.

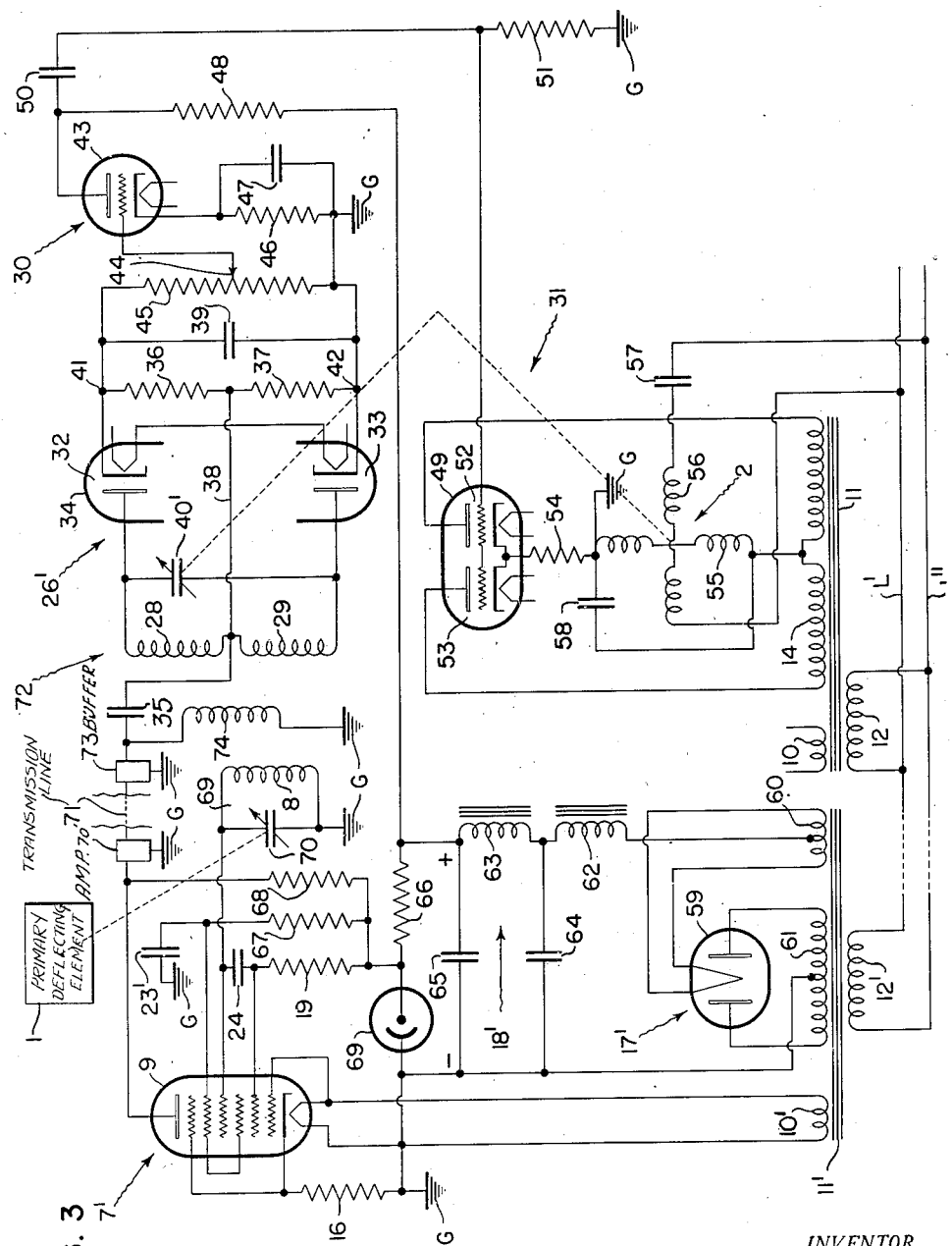

Patented Mar. 8, 1949

2,464,193

UNITED STATES PATENT OFFICE 2,464,193

CONTROL APPARATUS

Rudolf F. Wild, Philadelphia, Pa., assignor, by mesne assignments, to Minneapolis-Honeywell Regulator Company, Minneapolis, Minn., a corporation of Delaware Application July 18, 1945, Serial No. 605,741

4 Claims. (Cl. 250—36)

The present invention relates to electrical systems incorporating thermionic oscillation generators and, in its practical application, has especial utility in connection with sensitive torque amplifying and follow-up systems of the frequency discriminating type disclosed in my prior application Serial Number 537,505, filed on May 26, 1944.

An object of the invention is to provide improvements in electrical systems of the kind to which reference has been made. Another object of the invention is to adapt thermionic oscillation generators of the negative resistance type for use in such electrical systems to the ends of simplicity and improved performance.

A more specific object of the invention is to adapt thermionic oscillation generators of the negative resistance type for use in follow-up electrical systems of the type referred to above in order to obtain more linear correspondence between the motion of the transmitting or sensitive primary deflecting element and the motion of the receiving or follow-up element.

In the torque amplifying and follow-up systems of the frequency discriminating type which have heretofore been proposed, the thermionic oscillation generator for producing the high frequency oscillating current of variable frequency has been of the type which employs a feedback circuit comprising a so-called "tickler coil" inductively related to an inductance coil connected in the frequency determining circuit for maintaining the generator in an oscillating state. Due to inherent limitations in oscillator circuits, the coupling between these two coils must necessarily be close, whereby the mutual inductance between the two coils is high. No mutual inductance of corresponding magnitude is present in the receiver portion of the system, and in consequence, for reasons hereinafter explained, the transmission of movement at the transmitter to the receiver tends to be non-linear. That is to say, no fixed relation exists between a predetermined movement at the transmitter and the resultant motion obtained at the receiver. The reason for such non-linear transmission of movement from the transmitter to the receiver is directly traceable to the difference in mutual inductance at the transmitter and receiver. Because of this difference, the relationships between resonant frequency and circuit component values at the transmitter and receiver are appreciably different.

Specifically, while for a single parallel resonant circuit, the relationship $$f = \frac{1}{2\pi\sqrt{LC}}$$

exists between the resonant frequency and its circuit component values (where $f$ is frequency, $L$ is inductance, and $C$ is capacitance), this relationship does not hold true for inductively coupled resonant circuits because of the reflection of one circuit impedance into the other circuit by virtue of the mutual inductance between the circuits. The extent of deviation of the modified frequency relationship from that of the case of a single resonant circuit depends upon the amount of mutual inductance and the resonant frequencies of both circuits. If different relationships between resonant frequency and circuit component values exist at the transmitter and receiver portions of a follow-up system, it is evident that it is not possible to obtain linear transmission of the motion of the transmitting or sensitive primary deflecting element to the receiving or follow-up element.

It is recognized that such non-linear transmission may be corrected by inductively coupling another resonant circuit to the resonant circuit at the receiver in order to duplicate the mutual inductance effect present at the transmitter in the receiver. This method of obtaining a linear transmission of indications, however, is cumbersome and otherwise undesirable.

Such non-linear transmission between the motions of the transmitting or sensitive primary deflecting element and the resulting motion of the receiving or follow-up element is avoided in accordance with the present invention by employing a thermionic oscillation generator of the negative resistance type in place of the conventional oscillator. Oscillation generators of the negative resistance type do not utilize a "tickler coil," and hence, non-linearity of transmission, due to changes of inductance in the frequency determining circuit brought about by changes in mutual inductance, is eliminated, thereby materially improving the system performance, and rendering the system suitable for applications for which it would otherwise be unsuitable.

A feature of the invention, accordingly, resides in the adaptation of thermionic oscillation generators of the negative resistance type for use in torque amplifying and follow-up frequency discriminating systems to the attainment of such improved system performance.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is a diagrammatic representation of one embodiment of the invention;

Fig. 2 illustrates the mechanical details of the variable condenser of Fig. 1; and Fig. 3 illustrates another embodiment of the invention. Similar numerals refer to similar parts of the different figures.

In Fig. 1 there is illustrated, more or less diagrammatically, a torque amplifying system embodying the principles of my invention and in which the deflections of a sensitive primary deflecting element, indicated generally by the reference character 1, may be utilized to cause corresponding deflections of a relatively heavier and rugged indicating or other member mounted on or rotated through suitable gearing by the shaft of a reversible electrical motor 2. To this end one set of plates 3 of a variable condenser shown in detail in Fig. 2 is carried by the shaft of the sensitive and delicate deflecting member while the other set of plates 4 of the condenser is adapted to be rotated by the reversible motor 2. As shown in Fig. 2, the set of condenser plates 4 is mounted on a spur gear 5 driven by a gear sector 6 and pivoted for rotation on a shaft coincident with the axis of rotation of the primary sensitive deflecting element. The gear sector 6 may be mounted directly on the shaft of the motor 2, or, if desired, may be rotated by the shaft of motor 2 through suitable gearing.

The electrical condenser comprised of the relatively movable sets of plates 3 and 4 is utilized as the variable reactance tuning element of the frequency determining circuit of a thermionic oscillator indicated generally by the reference numeral 7. Oscillator 7 is of the negative resistance type, and specifically, is of the negative-transconductance type. The frequency determining circuit of oscillator 7 also includes an inductance coil 8, which, as shown, is connected in parallel with the electrical condenser formed by the sets of plates 3 and 4.

The oscillator 7 includes a vacuum tube 9 which is a multi-grid tube and, for example, may be of the commercially available 7A8 type. The tube 9 includes a plate, a plurality of grids, a cathode, and a heater filament. Energizing current is supplied the heater filament from the low voltage secondary winding 10 of a transformer 11 having a line voltage primary winding 12 and additional high voltage secondary windings 13 and 14.

Alternating energizing voltage is supplied the plate circuit of the tube 9 from the transformer secondary winding 13 through a circuit which may be traced from the left end terminal of the winding 13, as seen in the drawing, through a conductor 15, the plate of tube 9, the cathode thereof, a cathode biasing resistance 16 to ground G, and through ground G to the right end terminal of winding 13. As shown, the grid electrode nearest to the cathode is connected to the grounded terminal of the biasing resistance 16.

Unidirectional voltage is supplied to the second grid electrode of tube 9 from the transformer secondary winding 13 through a rectifier 17. The energizing circuit to the second grid electrode of tube 9 is completed through the cathode biasing resistance 16 to the grounded terminal of the transformer secondary winding 13. Thus, the second grid electrode of tube 9 is utilized as an anode.

The rectifier 17 is shown as a triode including plate, control grid, cathode and heater filament elements. Energizing current is supplied the heater filament from the transformer secondary winding 10. The plate of rectifier 17 is connected to the left end terminal of the transformer secondary winding 13 and the cathode and control grid are connected directly to each other, and through a resistance 19 to the second grid electrode of tube 9. In addition to supplying unidirectional voltage to the second grid electrode of tube 9, rectifier 17 also supplies unidirectional voltage through a filter 18 to other portions of the equipment. As shown, the filter 18 includes condenser elements 20 and 21 and a resistor 22.

As shown, the third and fifth grid electrodes of tube 9 are directly connected to each other and by a conductor 23 to the positive terminal of rectifier 17. These grid electrodes are also coupled by filter 18 to ground G and serve the normal function of screen electrodes. The sixth grid electrode, that nearest the plate, is directly connected to the cathode of tube 9 and serves as a suppressor.

The fourth grid electrode, shown as positioned between the two screen electrodes, is coupled by a condenser 24 to the second grid electrode of tube 9 and is also connected in the frequency determining circuit of the oscillator, being directly connected by a conductor 25 to the upper terminal of the tank circuit including the condenser 3, 4 and the inductance 8. The lower terminal of the tank circuit is connected to ground G and thereby to the negative terminal of resistor 16.

As noted previously, the thermionic oscillator 7 is essentially an oscillator of the negative resistance type. That is to say, it does not utilize the "tickler coil" customarily employed in thermionic oscillators, but relies for the production of sustained oscillating currents upon a negative resistance characteristic exhibited by tube 9. Oscillating currents are produced and sustained in the tank circuit including condenser plates 3, 4 and inductance 8 by virtue of the fact that when the potential on the fourth grid electrode becomes less negative, the number of electrons going to the plate increases, while the number of electrons going to each of the grid electrodes decreases. In the range of oscillation, an increase of voltage on the fourth grid electrode causes an increase in the voltage on the second grid electrode because the smaller number of electrons going to the second grid electrode causes the voltage drop across resistor 19 to become correspondingly smaller. Since the fourth grid electrode is coupled by condenser 24 to the second grid electrode, the potential on the fourth grid electrode is driven further in the less negative direction. This action causes a further reduction in electron flow to the second grid electrode, and hence, in the voltage drop across resistor 19, which in turn, causes the fourth grid electrode to be driven still further in the less negative direction.

Conversely, when the potential of the fourth grid electrode becomes more negative, the electron flow in the plate circuit is decreased while the electron flow through resistor 19 is increased, which increase effectuates through the action of coupler condenser 24 a further increase in negative potential on the fourth grid electrode.

The extent, in each case, to which the fourth grid electrode is thus driven less negative and more negative is determined by the constants of the tube and tank circuits. The oscillator circuit is not stable when the potential of the fourth grid electrode is at either extreme value, and since the only change in potential of the fourth grid electrode which can then occur is toward the opposite extreme, the potential of the fourth grid electrode will alternately surge from one extreme to the other. The rate at which such surging takes place is determined by the inductance (L) and capacitance (C) constants of the tank circuit, and hence may be varied by adjustment in the relative positions of the sets of condenser plates 3 and 4.

From the foregoing explanation, it is evident that the tube circuit connected between the terminals of the tank circuit exhibits a current-voltage characteristic curve of negative slope within the oscillating range of operation. This negative resistance serves to convert the direct-current power derived from the transformer 13 through rectifier 17 into alternating current power in the tank circuit at a frequency determined by the L-C constants of that circuit.

Since alternating voltage is applied to the plate of the tube 9 from the transformer secondary winding 13, the oscillation generator 7 will produce an oscillating output current only during alternate half cycles of the supply line voltage, namely during those half cycles in which the plate of tube 9 is positive. For convenience of explanation, these alternate half cycles will be referred to hereinafter as the operative half cycles. The energization of the plate circuit of tube 9 from the transformer secondary winding 13, therefore, results in the high frequency oscillations generated by the oscillator 7 being keyed or substantially 100% modulated at the frequency of the alternating current supplied by the supply lines.

It is an important feature of the invention that the envelope of the modulated high frequency output current of the oscillation generator 7 approximates a square wave. To the attainment of this end the biasing resistor 16 is provided. Biasing resistor 16 is not by-passed, and appears to act in a degenerative manner to prevent the electron flow between the cathode and plate of tube 9 from increasing beyond a predetermined value substantially smaller than the maximum amplitude it would otherwise build up to in a sinusoidal manner when the source of alternating current varies in accordance with the law of sines. In this manner, the high frequency oscillating currents are made to assume their maximum amplitude near the beginning of each operative half cycle of the alternating voltage supply and to continue at maximum amplitude until near the end of each operative half cycle.

Specifically, the biasing resistor 16 operates to control the voltage developed across the frequency determining circuit including the condenser 3, 4 and inductance 8, and also controls the plate voltage at which the oscillations will start. Thus, resistor 16 controls the duration of the oscillations in each operative half cycle of the supply line voltage. In particular, resistor 16 increases the negative bias of the first grid electrode. This effectively increases the positive voltage at which the plate must be at any instant to produce oscillations in the tank circuit, thus decreasing the duration of oscillation. By properly choosing the value of resistor 16 in relation to the values of the other circuit components, however, the time duration of the oscillations generated by oscillator 7 may be made to correspond substantially to the duration of the operative half cycles. In other words, when the frequency of the alternating current supplied by the supply lines L' and L'' is 60 cycles per second, the time duration of the oscillations during the operative half cycles may be made substantially 1/20 of a second, the keyed oscillations produced being substantially in phase with the supply line voltage. The oscillations will then be completely cut off during the negative half cycles of the plate voltage. Accordingly, the oscillations generated by the keyed oscillator 7 will have a substantially square wave envelope with the period during which oscillations occur being of substantially the same duration as the period in which there are no oscillations.

The manner in which the reversible electrical motor 2 is selectively energized for rotation in one direction or the other under control of the variable condenser 3, 4 will now be explained. As has been previously noted, variation in the tuning of the condenser 3, 4 results in a change in the frequency of the square wave modulated high frequency oscillations generated by the oscillator 7. Variations in the frequency of oscillation of the high frequency oscillating currents generated by oscillator 7 are detected by means of a discriminating network indicated generally by the reference character 26.

Frequency discriminating network 26 includes an air core transformer 27 having a primary winding and a center tapped secondary winding. As shown, the primary winding of the transformer 27 is utilized in the arrangement of Fig. 1 to serve the purpose of the inductance coil 8 in the tank circuit of the oscillator 7. The center tapped secondary winding is provided with winding sections 28 and 29. The frequency discriminating means 26 operates to create a fluctuating output voltage of supply line frequency when the frequency of the high frequency oscillations generated by oscillator 7 deviates from a value to which the frequency discriminating means 26 is tuned. The fluctuating output voltage so created is of one phase or of opposite phase relatively to the voltage of the alternating current supply lines, depending upon whether the frequency of the generator output oscillating currents is higher or lower than the frequency to which the frequency discriminating means is tuned.

The fluctuating voltage so produced by the frequency discriminating means 26 is amplified by a voltage amplifier and limiter indicated generally by the reference numeral 30, and the amplified quantity is applied to control a power amplifier indicated generally by the numeral 31. The power amplifier 31, in turn, controls the rotation and direction of rotation of the reversible motor 2. Motor 2 operates to adjust the position of the condenser plate 4 relative to the condenser plate 3 to accomplish the follow-up action which restores the normal positional relation of the two condenser plates, and thereby restores the frequency of the high frequency oscillating currents produced by generator 7 to the value for which the frequency discriminating means 26 is tuned.

In addition to the transformer 27, the frequency discriminating means 26 includes a pair of diode rectifiers 32 and 33 which desirably may be contained within a single envelope, generally designated at 34.

The junction of the winding sections 28 and 29 of the transformer 27 is connected through a blocking condenser 35 to the upper terminal of the frequency determining circuit of the oscillator 7 and is also connected to the junction of a pair of resistances 36 and 37 by means of a conductor 38. If desired, an inductance coil or choke may be inserted in the conductor 38. The output voltage from the frequency discriminator 26 is obtained across the resistors 36 and 37.

The diode rectifiers 32 and 33 may be contained within a single tube such as the commercially available type 6H6. As shown, each of the diodes 32 and 33 includes anode, cathode, and heater filament elements. The heater filament elements are connected in series with each other and the transformer secondary winding 10. The cathode of diode 32 is connected by the resistor 36 and the conductor 38 to the junction of the transformer winding sections 28 and 29. The cathode of triode 33 is also connected to that junction by resistor 37 and conductor 38. The anode of diode 34 is connected to the end terminal of winding section 28, while the anode of diode 33 is connected to the end terminal of winding section 29. A condenser 39 is connected in parallel with both of the resistors 36 and 37. A condenser 40 is connected across both of the winding sections 28 and 29 for tuning the latter to a center frequency, for example 450,000 cycles per second, about which the high frequency oscillating current output of generator 7 is adapted to be varied. The blocking condenser 35 and the condenser 39 are so selected as to present low impedance to the high frequency oscillating currents flowing through them.

When the frequency of the oscillating currents generated by the oscillator 7 is 450,000 cycles per second, the value to which the frequency discriminator 26 is tuned, the voltage induced in the winding sections 28 and 29, and appearing across the terminals of the winding sections 28 and 29, will be 90° out of phase with the voltage across the primary winding or coil 8. The phenomena giving rise to the 90° phase shift between the secondary and primary voltages is one known in the art and is based on the fact that in a transformer, the secondary winding of which is resonant, a phase shift of 90° occurs between the primary and secondary voltages.

The transformer winding sections 28 and 29 are so wound relative to each other that the voltage produced across the winding 28 is 180° out of phase with the voltage appearing across the winding 29. The voltage produced across the winding section 28 is impressed on the circuit including the diode rectifier 32 and resistor 36, while the voltage produced across the winding section 29 is impressed on the circuit including the diode 33 and the resistor 37. Superimposed on these voltages impressed on the diodes 32 and 33, and the respectively associated resistors 36 and 37, is the voltage developed across the inductance coil or winding 8. This latter voltage is superimposed on the diode circuits inasmuch as the upper terminal of the winding 8 is connected by the blocking condenser 35 to the junction of the transformer winding sections 28 and 29. Accordingly, the resultant voltage impressed on the circuit including the diode 32 and resistor 36 is the vector sum of the voltages across the inductance coil 8 and the winding section 28, while the resultant voltage impressed on the circuit including diode 33 and resistor 37 is the vector sum of the voltages produced across inductance coil 8 and the winding section 29. It is noted that the resultant voltage in each case is the vector sum of two voltages which are in phase quadrature at resonance. The voltage applied to the diode 32 from the winding section 28 leads the voltage from the inductance coil 8 by 90°, however, while the voltage applied to the diode 33 from the winding section 29 lags by 90° the voltage of inductance coil 8. The absolute values of the primary and secondary voltages in relation to each other are not critical and may be selected as desired.

The 90° phase relationship between the voltages appearing across the inductance coil 8 and the transformer winding sections 28 and 29 occurs only when the frequency of the oscillations generated by the oscillator 7 is the value to which both the inductance coil 8 and the winding sections 28 and 29 are resonant. Upon departure of the frequency of the oscillations generated by the oscillator 7 from this value, the voltage appearing across the secondary winding sections 28 and 29 also departs from the 90° phase relationship with the voltage across inductance coil 8. For example, upon increase in the applied frequency from the value to which the discriminator is tuned, the phase displacement between the voltage appearing across the winding section 28 and that across the inductance coil 8 decreases toward zero, while the phase displacement between the voltage appearing across the winding section 29 and the voltage across inductance coil 8 increases toward 180°. Upon decrease in the applied frequency, the converse is true. Thus, when the frequency of the oscillations produced by generator 7 deviates from the value to which the frequency discriminator 26 is tuned, the voltage across one of the secondary winding sections 28 and 29 will be more nearly in phase with the voltage across the inductance coil 8, while the voltage across the other secondary winding section will be more than 90° and less than 180° out of phase with the voltage across inductance coil 8.

As a result of this action, the resultant voltage applied to one diode 32 or 33 will decrease, while the resultant voltage applied to the other diode will increase. Consequently, the voltage drop produced across the associated resistors 36 and 37 will be correspondingly increased and decreased.

Inasmuch as the high frequency oscillating currents generated by oscillator 7 are modulated or keyed at the frequency of the alternating current supplied by the supply lines L' and L", the voltage drop produced across the resistors 36 and 37 will only be produced during the regularly recurring intervals when the oscillator 7 is producing an oscillating current output. When no high frequency currents are generated by the oscillator 7, no voltage difference is created across either of the resistors 36 or 37. Accordingly, there are two conditions in which the resultant of the voltages across resistors 36 and 37 is zero. The first condition is that in which no high frequency currents are generated by the oscillator 7, and the second condition is that occurring when the frequency of the high frequency oscillating currents generated by the oscillator 7 is the value to which the frequency discriminator 26 is tuned.

From the foregoing it is evident that the potentials at the terminals 41 and 42 at the remote ends of the resistors 36 and 37, respectively, are identical when the frequency of oscillation of the high frequency currents generated by the oscillator 7 is the value to which the discriminator 26 is tuned, and that upon deviation in the frequency of the currents generated by oscillator 7, a pulsating voltage of one phase or of the opposite phase, with respect to the voltage of the supply lines L' and L'', is created between the terminals 41 and 42. This pulsating voltage will have a substantially square wave characteristic by virtue of the fact that the high frequency oscillating currents produced by the oscillator 7 are modulated with a square wave. The amplitude of fluctuation of the pulsating voltage so produced between the terminals 41 and 42 varies in accordance with the extent of deviation of the high frequency currents generated by the oscillator 7 from the value to which the discriminator 26 is tuned.

It will be evident that my invention, in its practical application, is not restricted to the use of a frequency discriminator of the type disclosed, inasmuch as other types, particularly those used for automatic frequency control and frequency modulation detection in radio broadcasting receivers, may be employed equally as well.

The voltage amplifier and limiter 30 comprises one section 43 of a twin type tube, for example, the commercially available type 7N7 tube, the other section of which is utilized as the rectifier 17. The section 43 includes anode, control grid, cathode, and heater filament elements. Energizing current is supplied to the heater filament from the transformer secondary winding 10.

The input circuit of the tube section 43 is controlled in accordance with the resultant voltage drop produced between the output terminals 41 and 42 of the frequency discriminator 26, and to this end, the control grid of tube section 43 is connected to a contact 44 which engages and is adjustable along the length of resistor 45 shunting the terminals 41 and 42. The terminal 42 is connected to the cathode of tube section 43 through a parallel connected resistor 46 and condenser 47. Direct coupling between the output terminals of the frequency discriminator 26 and the input circuit of the voltage amplifier and limiter 30 is utilized in preference to resistance-capacity coupling in order to minimize distortion of the square wave characteristic of the output voltage. Resistance-capacity coupling may be employed if desired, however. It will be noted that the output terminal 42 of frequency discriminator 26, and consequently the cathode of the tube section 43, is connected to ground at G.

Anode voltage is supplied to the tube section 43 of the voltage amplifier and limiter from the rectifier 17 through a circuit which may be traced from the positive terminal of the rectifier through the filter network 18, through a resistor 48 to the anode of tube section 43, the cathode thereof, the parallel connected resistor 46 and condenser 47 to ground G, and through the transformer secondary winding 13 to the negative terminal of the rectifier. The resistor 46 and parallel connected condenser 47 serve to bias the control grid of the tube section 43 for the purpose of maintaining the voltage of said control grid at a predetermined mean value when no fluctuating voltage is produced between the output terminals 41 and 42 of the frequency discriminator 26. This biasing circuit serves to provide proper biasing potentials as required for good amplification of small frequency discriminator output or signal voltages. For frequency discriminator output voltages in excess of a predetermined amplitude, the tube section 43 acts as a limiter due to saturation and cut-off. In this manner, the characteristic of the voltage output from the frequency discriminator 26 of increasing in amplitude with change in applied frequency until a maximum is reached, and thereafter decreasing in amplitude with further changes in the same direction in the applied frequency, is prevented from affecting the operation of the power amplifier 31 and the motor 2.

The power amplifier 31 comprises a twin triode tube 49 such as a type 7N7 tube. Both triodes of the tube 49 include anode, control grid, cathode and heater filament elements. The heater filament elements are connected to and receive energizing current from the transformer secondary winding 10. The control grids of both triodes, as shown, are directly connected to each other and to the junction of a condenser 50 and a resistor 51. The condenser 50 and resistor 51 are connected in the order named from the anode of the tube section 43 to ground at G. The condenser 50 is provided for impressing the fluctuating component of voltage produced across the resistor 48 in the anode circuit of the voltage amplifier and limiter 30 on the input circuit of the power amplifier 31, while preventing the D. C. component of the anode circuit voltage of the voltage amplifier and limiter 30 from being impressed on the input circuit of the power amplifier 31. The signal from the voltage amplifier and limiter 30 is impressed simultaneously and equally on the control grids of both triodes of tube 49 of the power amplifier 31.

Anode voltage is supplied to both triodes of the tube 49 from the transformer secondary winding 14 which, as shown, is provided with a center tap. In particular, the anode of triode section 52 of tube 49 is connected to the right end terminal of the transformer secondary winding 14, while the anode of triode section 53 is connected to the left end terminal of that winding. The cathodes of both triodes 52 and 53 are connected together and through a biasing resistor 54 to ground G. The center tap on the transformer secondary winding 14 is connected through the control winding 55 of motor 2 to ground G, and hence, through the biasing resistor 54, to the cathodes of the power amplifier tube 49.

While not shown in order to avoid complication of the drawing, the reversible motor 2 is provided with a stator having four pole pieces which are physically spaced apart by 90°, and also includes a squirrel cage rotor having interconnected conductor bars. The control winding 55 is wrapped around two of the opposite pole pieces of the stator, and a power winding 56 is wrapped around the remaining two opposite pole pieces. The power winding 56 is directly connected to the alternating current supply lines L' and L'' through a condenser 57 of suitable value. When only the power winding 56 is energized, the rotor of motor 2 is not urged to rotation in either direction and remains stationary. When the control winding 55 is energized and the voltage and current through it lead the voltage and current, respectively, in the power winding 56, the rotor of motor 2 is actuated for rotation in one direction, for example, in a clockwise direction.

Conversely, the rotor of motor 2 is urged to rotation in the opposite direction when the voltage and current in the control winding 55 lag the voltage and current, respectively, in the power winding 56.

The motor 2 is preferably so constructed that the control winding 55, when connected across a condenser 58, has a high impedance to match the impedance of the anode circuits of the power amplifier 31 when the rotor is rotating at full speed. By providing a power winding having high impedance, increased efficiency of operation is obtained. Preferably, the control and power windings of the motor have a high ratio of inductive reactance to resistance, for example, from 6 to 1 to 8 to 1 at the frequency of the alternating current supplied by the supply lines L' and L". This provides for maximum power during the running condition with the least amount of heating, and also provides a low impedance path in the control winding for anti-hunting purposes. By so designing the motor, reduction in heating thereof during its stalled condition is also obtained.

The condenser 57 connected in series with the power winding 56 of motor 2 is so chosen with respect to the inductive reactance of the power winding 56 as to provide a substantially series resonant circuit when the rotor of the motor 2 is rotated at approximately full speed. By virtue of this series resonant circuit, the total impedance of the power winding circuit is substantially equal to the resistance of the power winding 56. Since this resistance is relatively low, a large current flows through the power winding, resulting in the production of maximum power and torque by the motor. In addition, the current flow through the power winding 56 is substantially in phase with the supply line voltage. The voltage across the power winding 56, however, leads the current flow by substantially 90° because of the inductance of the power winding.

When the rotor of motor 2 is operating at approximately maximum speed, the apparent inductance of the power winding 56 is a maximum, whereupon the series resonant circuit is resonant to the frequency of the alternating current supplied from the lines L' and L". As the speed of rotation of the rotor decreases, the appparent inductance of the power winding decreases, and consequently, disturbs to some degree the resonant condition. This causes a slight phase shift in the current through and the voltage across the power winding, the voltage shifting somewhat more than the current, and hence, results in a reduction of the power loss in the power winding. Moreover, the change from the resonant condition reduces the current flow through the power winding, and because of the decrease in apparent inductance, the voltage across the power winding also decreases. This produces a further reduction of power loss in the power winding. As a result, there is a substantial reduction of heating of the power winding when the rotor of motor 2 is at rest, as compared to the condition when the rotor is operating at full speed.

As shown, a condenser 58 is connected in parallel with the control winding 55 of motor 2. The value of this condenser 58 is so chosen as to provide a parallel resonant circuit during both the stalled and running conditions of the motor. This parallel resonant circuit presents a relatively high external impedance and a relatively low internal impedance. The relatively high external impedance of the parallel resonant circuit matches the impedance of the anode circuits of the power amplifier triodes 52 and 53, and hence, provides for optimum conditions of operation. The relatively low internal circuit impedance of the control winding 55 and condenser 58 approximates the actual resistance of the control winding 55. Since this resistance is relatively low, the impedance of the internal circuit is also relatively low, making possible a large current flow through the control winding.

Since the anodes of triodes 52 and 53 are connected to opposite end terminals of the transformer secondary winding 14, the anodes of the triodes 52 and 53 are driven positive during alternate half cycles of the alternating current supplied by lines L' and L". For convenience of explanation, the half cycle in which the anode of triode 52 is driven positive will be referred to hereafter as the first half cycle, while the half cycle in which the anode of triode 53 is driven positive will be referred to as the second half cycle. Accordingly, the voltage on the anode of triode 52 will be caused to increase and decrease in phase with the supply line voltage and the voltage on the anode of triode 53 will be caused to increase and decrease 180° out of phase with the supply line voltage.

When the frequency of the high frequency oscillations produced by the generator 7 is the value to which the frequency discriminator 26 is tuned, no voltage is then produced across the frequency discriminator output terminals 41 and 42, and accordingly, no alternating component of voltage is impressed on the control grids of the power amplifier triodes 52 and 53. Under these conditions, triodes 52 and 53 conduct during alternate half cycles of the supply line voltage. Inasmuch as the control grids of triodes 52 and 53 are directly connected together and the voltages of these control grids are identical, the power amplifier 31 produces pulses of current of equal magnitude through the control winding 55 during each half cycle of the supply line voltage. The parallel resonant circuit formed by the control winding 55 and condenser 58 provides a high external impedance which is substantially resistive in character, and accordingly, a pulsating voltage drop in phase with the anode current flows of the triodes 52 and 53 is produced across the control winding 55 by the flow of pulsating anode current through the parallel resonant circuit. The pulsating voltage across the control winding 55 produces a current through the winding which includes a D. C. component and an alternating component having a fundamental frequency of twice the frequency of the alternating current of supply lines L' and L". Thus, an alternating component of current having a frequency of 120 cycles per second is produced through the control winding 55 when the frequency of the alternating current supply lines L' and L" is 60 cycles per second.

Due to the inductance of the control winding 55, the current flow through the control winding lags the voltage across the winding by substantially 90° of the 120 cycle voltage, or 45° of the 60° cycle voltage. The condenser 58 connected in parallel with the control winding 55 operates to maintain the D. C. component of current flow through the control winding at a substantially steady value and also provides a low impedance path for the 120 cycle component of the current flow in the control winding. Since the control winding has a low resistance, the D. C. component through it is relatively great, while the amplitude of the alternating current flow is relatively small because of the high inductance of the control winding. Due to the relatively high D. C. component of current through the control winding, the core structure tends to become saturated, with the result that the inductive reactance of the control winding is relatively small. The condenser 58 is so selected with respect to this inductive reactance at 120 cycles that the condenser 58 in parallel to the control winding 55 provides a substantially parallel resonant circuit.

The relatively large D. C. current and 120 cycle current through the control winding 55 under these conditions act to retard rotation of the motor rotor. That is to say, rotation of the rotor causes its conductor bars to cut flux produced by the D. C. and 120 cycle components of current flowing through the control winding 55, and this action creates a relatively heavy current through the conductor bars which quickly expends the force urging the rotor to rotation, and hence, provides an efficient braking action.

It is noted that during the alternate half cycles of the 60 cycle supply line voltage, the 120 cycle A. C. component of the current flowing through the control winding 55 has both a high peak and a low peak. The high peak and the low peak of each half cycle of the 120 cycle component cancel each other, and therefore, do not provide any turning effort on the rotor. Although the 120 cycle component of current through the control winding does not create any tendency for the rotor to rotate, this component of current acts similarly to the D. C. current component to retard rotation of the rotor. Rotation of the rotor causes its conductor bars to cut flux produced by the 120 cycle component through the control winding 55 and this also produces a relatively heavy current in the rotor conductor bars which acts to expend the force urging the rotor to rotation.

From the foregoing explanation, it is clear that under balanced conditions the motor 2 remains stationary and any tendency for the rotor to rotate is rapidly dissipated by the braking action obtained.

Upon change in the relative positions of the sets of condenser plates 3 and 4 due to a change in deflection of the instrument 1, a corresponding change is produced in the frequency of oscillation of the high frequency oscillating currents generated by generator 7. Inasmuch as this new frequency of oscillation of generator 7 does not correspond to the frequency to which the frequency discriminator 26 is tuned, a 60 cycle per second component of fluctuating voltage having a square wave envelope is produced between the output terminals 41 and 42 of the discriminator. The phase of this fluctuating voltage derived at the output terminals of the frequency discriminator 26 is dependent upon the direction of change in the frequency of oscillation of the high frequency currents produced by generator 7. This fluctuating voltage is amplified by the voltage amplifier and limiter 30 and the amplified quantity is impressed on the control grids of the power amplifier triodes 52 and 53.

With this signal voltage impressed on the control grids of the power amplifier triodes, the pulsating D. C. anode current flowing through the motor control winding 55 during one half cycle will be decreased, while the pulsating current flowing through the winding during the other half cycle will be increased. The current flow will be decreased during said one half cycle because the voltage of the control grids is driven negative during the half cycle when the anode of one of the triodes 52 and 53 is positive. The pulsating D. C. anode current flow is increased during the second half cycle because during this half cycle the control grids are rendered less negative during the time that the anode of the other triode is positive. Symmetry in the 120 cycle pulsating voltage across the control winding 55 vanishes, therefore, and instead a 60 cycle alternating component of voltage is produced across the control winding. In addition, when the 120 cycle component of current through the control winding 55 begins to vanish, the D. C. component of current through the control winding also begins to decrease resulting in a corresponding reduction in the braking action exerted on the motor rotor. The 60 cycle alternating component of voltage thus created in the motor control winding produces a magnetic field which reacts with the magnetic field created by the power winding 56 to form a rotating field which urges the rotor to rotation in one direction.

The motor 2, therefore, operates in one direction or the other, accordingly as the frequency of oscillation of the generator 7 increases or decreases with respect to the value to which the frequency discriminator 26 is tuned. In addition, the speed of motor 2' in either direction is directly dependent, within a predetermined range, upon the magnitude of the increase or decrease in frequency of oscillation of the high frequency oscillating currents produced by the generator 7.

As the rotor of motor 2 rotates, the flux produced by the power winding 56 is distorted by the rotor rotation to cause some of the flux produced by the power winding to link the control winding 55. This induces additional voltage in the control winding which is of the same phase and frequency as the voltage normally produced therein. This induces current in the control winding through the low resistance local path of the parallel resonant circuit, thereby establishing a relatively large current flow through the parallel resonant circuit. The greater portion of the current, and hence, the power for the control winding when the motor is operating at maximum speed, is induced by this transformer action so that the triodes 52 and 53 of the power amplifier 31 need only conduct a relatively small portion of the total current or power required to energize the control winding 55. The amount of current conducted by this transformer action is proportional to the speed of rotation of the rotor. As will be apparent, this action tends to increase the life of the power amplifier tube 49.

For a more detailed description of the construction and mode of operation of the motor 2 and the power amplifier 31, reference is made to the application Serial Number 412,173, filed December 1, 1941, by Walter P. Wills, which issued as Patent No. 2,423,540 on July 8, 1947.

The rotation of the motor rotor is utilized to accomplish a follow-up movement of the set of condenser plates 4 relative to the set of condenser plates 3 as required to restore the frequency of oscillation of the high frequency currents produced by generator 7 to the frequency value to which the frequency discriminator 26 is tuned. In addition to operating the condenser plate 4, it will be evident that the shaft of the motor rotor may be connected to an indicating or recording element, not shown, for signalling or recording the position assumed by the sensitive and delicate deflecting instrument 1.

Merely by way of illustration, it is noted that when tubes 9, 17, 34, 43 and 49 are of the types noted, the values of the other circuit components of the torque amplifying system of Fig. 1 may be as follows:

| Part | Value |
| --- | --- |
| Resistor 16 | 500 ohms. |
| Resistor 19 | 250,000 ohms. |
| Resistor 22 | 25,000 ohms. |
| Resistor 36 | 500,000 ohms. |
| Resistor 37 | 500,000 ohms. |
| Resistor 45 | 1 megohm. |
| Resistor 46 | 5,000 ohms. |
| Resistor 48 | 150,000 ohms. |
| Resistor 51 | 150,000 ohms. |
| Resistor 54 | 150 ohms. |
| Condenser 3, 4 | 100-150 micro microfarads. |
| Condenser 20 | 10 microfarads. |
| Condenser 21 | 10 microfarads. |
| Condenser 24 | 500 micro microfarads. |
| Condenser 35 | 200 micro microfarads. |
| Condenser 40 | 125 micro microfarads. |
| Condenser 39 | 500 micro microfarads. |
| Condenser 47 | 25 microfarads. |
| Condenser 50 | 0.05 microfarads. |
| Condenser 57 | 1 microfarad. |
| Condenser 58 | 1 microfarad. |
| Inductance 8 | 1 millihenry. |
| Total inductance of secondary 28, 29 | 1 millihenry. |
| Winding 13 | 220 volts. |
| Winding 14 | 275 volts in each section. |

In Fig. 3 I have illustrated, more or less diagrammatically, a modification of the arrangement shown in Fig. 1 which has especial utility in those applications wherein it is desired to remotely indicate the position assumed by the sensitive and delicate deflecting instrument 1. As will become apparent, the use of a negative resistance oscillator in the arrangement of Fig. 3 results in more linear transmission of the deflections of the instrument 1 at the transmitter to the follow-up element in the receiver. With the arrangement of Fig. 3, the linearity of transmission is limited only by the accuracy of shaping of the plates of the tuning condensers utilized in the transmitting and receiving portions of the system.

As may be seen by reference to Fig. 3, the thermionic oscillator 7' is generally like the oscillator 7 of Fig. 1 and differs therefrom only in that the keying or modulation of the oscillator is accomplished by impressing a low frequency alternating current, for example, of supply line frequency, on the first grid electrode of tube 9. To this end the first grid electrode of tube 9 is connected to one terminal of the low voltage secondary winding 10' provided on a transformer 11' which is located at the transmitter and includes a primary winding 12' having its terminals connected to supply lines L' and L''. Although not shown, it will be understood that the primary windings 12' and 12 of the transformers 11' and 11 located respectively at the transmitter and receiver may be supplied with energizing current from separate sources supplying alternating current of the same frequency. When separate alternating current sources are utilized, suitable phase shifting means may be provided, preferably at the receiver, to relate the phase of the signals received at the receiver as required to provide proper operation of the apparatus. As shown, the other terminal of the winding 10' is connected to ground G, and thereby through the cathode biasing resistor 16 to the cathode of tube 9. The transformer secondary winding 10' is utilized also to supply energizing current to the filament of tube 9.

Unidirectional anode voltage is supplied the tube 9 from a full wave rectifier indicated generally by the reference character 17' through a filter network generally indicated at 18'. As shown, the full wave rectifier 17' includes a conventional rectifier tube 59 having a pair of anodes and a heater filament, to which heater filament energizing current is supplied from a low voltage secondary winding 60 provided on transformer 11'. One anode of tube 59 is connected to the right end terminal of a center tapped high voltage secondary winding 61 provided on transformer 11' and having its other end terminal connected to the other anode of tube 59. The center tap on winding 61 is connected to the negative input terminal of filter 18' and the positive input terminal of the latter is connected to a center tap provided on the transformer secondary winding 60.

As shown, the filter 18' includes suitable inductive reactance elements or choke coils 62 and 63 and condensers 64 and 65 connected in conventional manner.

The positive output terminal of filter 18' is connected through a resistor 66 to the common junction of three resistors 19, 67 and 68. The other end of resistor 68 is connected to the anode of tube 9 while the other ends of resistors 19 and 67 are connected, respectively, to the second and fifth grid electrodes of tube 9. The last mentioned end of resistor 19 is also coupled by condenser 24 to the fourth grid electrode and thereby to the upper terminal of the tank circuit 69 of the oscillator 7'. The fifth grid electrode is connected by a condenser 23' to ground G.

In order to maintain constant the voltages impressed on the anode and on the second and fifth grid electrodes of tube 9, a gaseous discharge regulator tube 69 is connected between the negative terminal of the filter and the junction point of resistors 66, 19, 67 and 68, as shown.

The tank circuit 69 of the oscillator 7' includes an inductive reactance element or coil 8 which is connected in parallel with a variable condenser 70. Condenser 70 is arranged to have its capacitance varied in accordance with the deflection of the primary sensitive deflecting element 1. Accordingly, as the capacitance of condenser 70 is varied in correspondence with the deflection of the instrument 1, the tuning of the frequency determining circuit 69 of the oscillator, and therefore the frequency of the high frequency oscillations produced by the oscillator 7', are correspondingly varied.

The manner of operation of the thermionic oscillator 7' is the same as that of the oscillator 7 of Fig. 1 with the exception that the keying or modulation is accomplished by the 60 cycle per second alternating current impressed on the first grid electrode. The envelope of the modulated high frequency oscillations produced by generator 7' is substantially square wave in character, just as is that generated by oscillator 7 in Fig. 1, by virtue of the action of the cathode biasing resistor 16, as previously explained.

The modulated high frequency oscillations produced by generator 7' are amplified by an amplifier indicated generally by the reference numeral 70' and are transmitted by a transmission line 71 to a receiver indicated generally by reference number 72 and which is remotely located with respect to the transmitter of which the oscillator 7' comprises a part. Transmission line 71, if desired, may comprise a coaxial cable.

As shown, the receiver 72 includes a buffer stage indicated generally by a block designated 73 on which are impressed the high frequency oscillating currents transmitted to the receiver. The amplifying stage 70 and the buffer stage 73 may both be of known construction and are both indicated schematically in order to avoid undue complication of the drawing.

The output circuit of the buffer stage 73 is impressed on the primary winding 74 of a frequency discriminator 26' which may be identical in construction to the frequency discriminator 26 of Fig. 1 and differs therefrom only in that the condenser 40' connected in parallel to the winding sections 28 and 29 is made variable and is adjustable in accordance with the rotation of the reversible motor 2. To this end, the relatively movable plates of the condenser 40' are arranged to be driven in any suitable manner by the motor 2. As shown, the output circuit of buffer stage 73 is also coupled by a condenser 35 to the junction point of the winding sections 28 and 29 of the frequency discriminator.

The operation of this embodiment of my invention is generally the same as that of the arrangement shown in Fig. 1 with the exception that the follow-up or rebalancing actions of the system are accomplished by adjustment of the variable condenser 40' as is required to retune the frequency discriminator 26' to the frequency value of the high frequency oscillating currents impressed thereon over the transmission line 71 from the transmitter. Thus, upon change in the deflection of instrument 1, and consequently, upon change in the frequency of the oscillating currents produced by generator 7', a pulsating square wave voltage of supply line frequency, and of one phase or of the opposite phase relative thereto, is produced between the output terminals 41 and 42 of the frequency discriminator. This pulsating voltage is amplified by the voltage amplifier 30 and by the power amplifier 31, and operates to selectively energize the reversible motor 2 for rotation in one direction or the other depending upon the phase of the pulsating current. In consequence, the motor 2 is actuated for rotation in a corresponding direction to effect adjustment of the capacitance of condenser 40' in the proper direction to effect tuning of the frequency discriminator 26' to the new frequency value of the high frequency oscillating currents being received from the transmitter. While not shown in the drawing, it is contemplated that the motor 2 may also be employed to adjust an indicating or recording element in unison with the condenser 40' to provide an indication or record of the deflections of the primary sensitive element 1 at the remotely located receiver.

Subject matter disclosed herein but not claimed, is disclosed and is being claimed in the application of Woodrow NeSmith, filed on even date herewith and bearing Serial Number 605,692.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is as follows:

1. In combination, oscillation generating means of the negative resistance type operative to produce oscillations having variable frequency and amplitude characteristics, means operative to produce in response to said oscillations a unidirectional output voltage having variable polarity and amplitude characteristics, and means to modify at least one of the characteristics of said oscillations during predetermined time intervals of an oscillation of lower frequency thereby to modify at least one of the characteristics of said output voltage in order to cause said output voltage to undulate at said low frequency and to be of one phase or of opposite phase depending upon the direction of departure of one of said oscillation characteristics from a predetermined value.

2. In combination, oscillation generating means of the negative resistance type operative to produce oscillations characterized by their frequency and amplitude being variable, adjustable means to adjust said oscillation generating means to vary the frequency of said oscillations, means operative to produce in response to said oscillations a unidirectional output voltage of one polarity or of opposite polarity accordingly as the frequency of said oscillations deviates in one direction or the other from a predetermined value, means to modify the amplitude of said oscillations during predetermined time intervals of an oscillation of lower frequency thereby to cause said output voltage to undulate at said low frequency, said undulations being of one phase or of opposite phase depending upon the direction of variation of the frequency of said oscillations from said predetermined value, and means responsive to the phase of said undulating voltage to adjust said adjustable means to restore the frequency of the oscillations produced by said oscillation generator to said predetermined value.

3. In combination, oscillation generating means of the negative resistance type operative to produce oscillations characterized by their frequency and amplitude being variable, means to adjust said oscillation generating means to vary the frequency of said oscillations, adjustable means operative to produce in response to said oscillations a unidirectional output voltage of one polarity or of the opposite polarity accordingly as the frequency of said oscillations deviates from a predetermined value depending upon the adjustment thereof, means to modify the amplitude of said oscillations during predetermined time intervals of an oscillation of lower frequency thereby to cause said output voltage to undulate at said low frequency, said undulations being of one phase or of opposite phase depending upon the direction in which the frequency of said oscillations deviates from said predetermined value, and means responsive to the phase of said undulating output voltage to adjust said adjustable means as required to reduce said undulating voltage.

4. In combination, a transmitter including oscillation generating means of the negative resistance type having a frequency-determining portion and operative to produce oscillations characterized by their frequency and amplitude being variable, means connected to said frequency-determining portion to adjust said oscillation generating means to vary the frequency of said oscillations, a receiver located remotely with respect to said transmitter and including adjustable means operative to produce in response to said oscillations a unidirectional output voltage of one polarity or of opposite polarity accordingly as the frequency of said oscillations deviates from a predetermined value depending upon the adjustment thereof, means for transmitting the oscillations produced by said oscillation generating means to said receiver, means included in said transmitter to modify the amplitude of said oscillations during predetermined time intervals of an oscillation of lower frequency thereby to cause said output voltage to undulate at said low frequency, said undulations being of one phase or of opposite phase depending upon the direction in which the frequency of said oscillations deviates from said predetermined value, and means included in said receiver and responsive to the phase of said undulating voltage to adjust said adjustable means as required to reduce said undulating voltage.

RUDOLF F. WILD.

REFERENCES CITED

The following references are of record in the file of this patent:

UNITED STATES PATENTS

| Number | Name | Date |
| --- | --- | --- |
| 2,226,561 | Herold | Dec. 31, 1940 |
| 2,379,689 | Crosby | July 3, 1945 |
| 2,396,088 | Crosby | Mar. 5, 1946 |